(12) United States Patent
Min et al.

(10) Patent No.: US 9,248,740 B2
(45) Date of Patent: Feb. 2, 2016

(54) ACTIVE CONTROL METHOD OF ACCELERATOR PEDAL EFFORT

(71) Applicants: Hyundai Motor Company, Seoul (KR); Kia Motors Corporation, Seoul (KR)

(72) Inventors: Jeong Seon Min, Gwangju (KR); Yang Rae Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 13/974,779

(22) Filed: Aug. 23, 2013

(65) Prior Publication Data

US 2014/0316649 A1 Oct. 23, 2014

(30) Foreign Application Priority Data

Apr. 23, 2013 (KR) ........................ 10-2013-0044850

(51) Int. Cl.
*B60K 26/00* (2006.01)
*B60K 26/02* (2006.01)
*F16D 66/02* (2006.01)

(52) U.S. Cl.
CPC ............... *B60K 26/021* (2013.01); *F16D 66/02* (2013.01)

(58) Field of Classification Search
CPC combination set(s) only.
See application file for complete search history.

(56) References Cited

U.S. PATENT DOCUMENTS

| 8,433,492 | B2 * | 4/2013 | Shiomi | B60K 26/021 180/170 |
| 8,660,746 | B2 * | 2/2014 | Yamazaki | B60K 26/021 701/36 |
| 2006/0224284 | A1 * | 10/2006 | Ueno | B60T 7/042 701/36 |
| 2011/0098901 | A1 * | 4/2011 | Shiomi | F02D 11/02 701/70 |

FOREIGN PATENT DOCUMENTS

| JP | 2008-201231 A | | 9/2008 |
| JP | 2008-221909 A | | 9/2008 |
| JP | 2008201231 | * | 9/2008 |
| JP | 2008221909 | * | 9/2008 |
| JP | 2010-052721 A | | 3/2010 |
| JP | 2010-052722 A | | 3/2010 |
| KR | 1020090063016 A | * | 6/2009 |
| KR | 10-2010-0063453 A | | 6/2010 |
| KR | 10-1327045 B1 | | 11/2013 |

* cited by examiner

*Primary Examiner* — Thomas G Black
*Assistant Examiner* — Ana Thomas
(74) *Attorney, Agent, or Firm* — McDermott Will & Emery LLP

(57) ABSTRACT

An active control method of accelerator pedal effort comprises steps to actively vary pedal effort. When a vehicle having a controllable pedal effort accelerator pedal runs, the active control method can actively vary the accelerator pedal effort according to an accelerator position sensor operation percentages selected by a driver, thereby improving the accelerator pedal manipulation efficiency of the driver.

8 Claims, 7 Drawing Sheets

ACTIVE CONTROL METHOD OF ACCELERATOR PEDAL EFFORT

CROSS-REFERENCE TO RELATED APPLICATION

This application claims under 35 U.S.C. §119(a) the benefit of Korean Patent Application No. 10-2013-0044850 filed on Apr. 23, 2013, the entire contents of which are incorporated herein by reference.

TECHNICAL FIELD

The present disclosure relates, in general, to an active control method of accelerator pedal effort and, more particularly, to an active control method of accelerator pedal effort of a vehicle, which can classify accelerator position sensor (APS) operation percentages into a plurality of groups according to sections, determine in which section the APS operation percentage selected by a driver at present when a vehicle is being driven is included, and actively vary the pedal effort of an accelerator pedal manipulated by the driver at present by pedal efforts preset according to sections, thereby improving the accelerator pedal manipulation efficiency of the driver.

BACKGROUND

FIG. 1 illustrates an organ type of accelerator pedal, as an example of related art vehicle accelerator pedals. The related art accelerator pedal includes a pedal arm housing 1 securely mounted to a frame panel placed below a driver's seat, and a pedal arm 2 with one end rotatably connected to the pedal arm housing 1. A pedal bracket 3 is securely mounted to a floor panel placed below the driver's seat. A pedal pad 4 with one end rotatably connected to the pedal bracket 3 is coupled to the pedal arm 2 by ball joint.

A spring plate 5, located in the pedal arm housing 1, is combined with an end of the pedal arm 2. An end of a spring 6, in the pedal arm housing, is held by the spring plate 5 and another end of the spring 6 is held by the pedal arm housing 1.

When the pedal arm 2, according to the related art accelerator pedal, is rotated around a hinge shaft 7, the spring 6 is elastically compressed and forms a pedal effort of the pedal pad 4.

However, the above-mentioned related art accelerator pedal uses a spring having a predetermined elastic modulus as the spring 6 to meet the safety laws and regulations, and thus the pedal effort of the related art accelerator pedal cannot be changed if the spring 6 is not changed. Further, in the related art accelerator pedal, accelerator pedal effort of a vehicle cannot be varied according to APS operation percentages when the vehicle is being driven, thus inconveniencing the driver.

The foregoing is intended merely to aid in the understanding of the background of the present disclosure, and should not be construed as being included in the related art that is already known by those skilled in the art.

SUMMARY

The present disclosure has been made to solve the above problems in the related art. An active control method of accelerator pedal effort according to the present disclosure classifies APS operation percentages into groups according to sections and determines in which section the APS operation percentage selected by a driver when a vehicle is being driven is included. The active control method can further actively vary the pedal effort of an accelerator pedal manipulated by the driver when a vehicle is being driven by pedal efforts preset according to respective sections, thereby improving the accelerator pedal manipulation efficiency of the driver.

According to an aspect of the present invention, an active control method of accelerator pedal effort includes a classification step of classifying accelerator position sensor (APS) operation percentages into groups according to sections. A data storing step stores information data about sections in which APS operation percentages selected at present when a vehicle having a controllable pedal effort accelerator pedal is being driven are included. A ranking decision step decides a ranking of the sections systematically based on stored information data, from a section in which APS operation percentages selected most frequently are included to another section in which APS operation percentages selected most rarely are included. A pedal effort control step determines accelerator pedal effort controls values differently according to the decided ranking of the sections, and controls a present accelerator pedal effort of the vehicle being driven, using the determined pedal effort control values.

The active control method may further include, after the ranking decision step, a ranking change determination step of determining whether the section ranking of present APS operation percentage selected at present when the vehicle is being driven has changed from the section ranking of previous APS operation percentage selected previously.

In the active control method, when the ranking change determination step determines that the section ranking of the present APS operation percentage has not changed from the section ranking of the previously selected APS operation percentage, the process may directly progress to the pedal effort control step.

However, when the ranking change determination step determines that the section ranking of the present APS operation percentage has changed from the section ranking of the previous APS operation percentage, a ranking redecision step may be performed. The ranking of the sections is decided again systematically, from one section in which APS operation percentages are most frequently selected to another section in which APS operation percentages are most rarely selected, by a combination of the present section ranking and the previous section ranking. The process may progress to the pedal effort control step after the ranking redecision step.

When the section in which the APS operation percentages are most frequently selected is designated as a first ranking section and the section in which the APS operation percentages are most rarely selected is designated as a tenth ranking section, and when the APS operation percentage selected at present approaches the first ranking section, the accelerator pedal effort may be reduced, and when the APS operation percentage selected at present approaches the tenth ranking section, the accelerator pedal effort may be increased.

The active control method may further include a pedal effort control system checking step of determining whether a pedal effort control system is in a normal state when the vehicle starts, prior to the data storing step.

When the pedal effort control system checking step determines that the pedal effort control system is in the normal state, the data storing step may be performed. When the pedal effort control system is in an abnormal state, the present accelerator pedal effort may be reset to an initial pedal effort.

When a battery voltage signal represents a normal state of a battery, no signal requiring an initialization of the present accelerator pedal effort against an abnormal state has been output, and a signal representing a pedal effort active control mode has been generated, the pedal effort control system checking step determines that the pedal effort control system is in the normal state.

As described above, the active control method of accelerator pedal effort according to the present disclosure has advantages. When a vehicle having controllable pedal effort accelerator pedal is driven, the active control method can actively vary the accelerator pedal effort according to the APS operation percentages selected by the driver, thereby improving the accelerator pedal manipulation efficiency of the driver.

BRIEF DESCRIPTION OF THE DRAWINGS

The above and other objects, features and other advantages of the present disclosure will be more clearly understood from the following detailed description.

DETAILED DESCRIPTION

Figure 1:
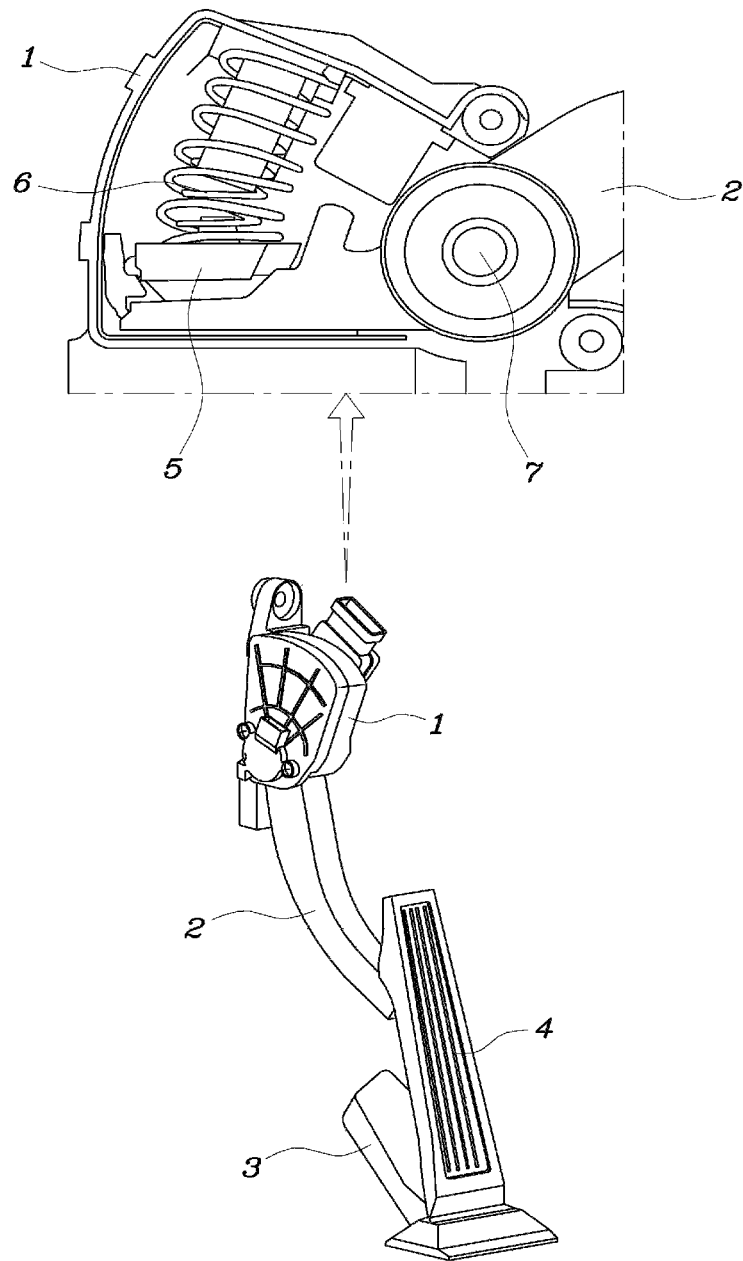
FIG. 1 is a view illustrating a related art accelerator pedal without a pedal effort control function.
Figure 2:
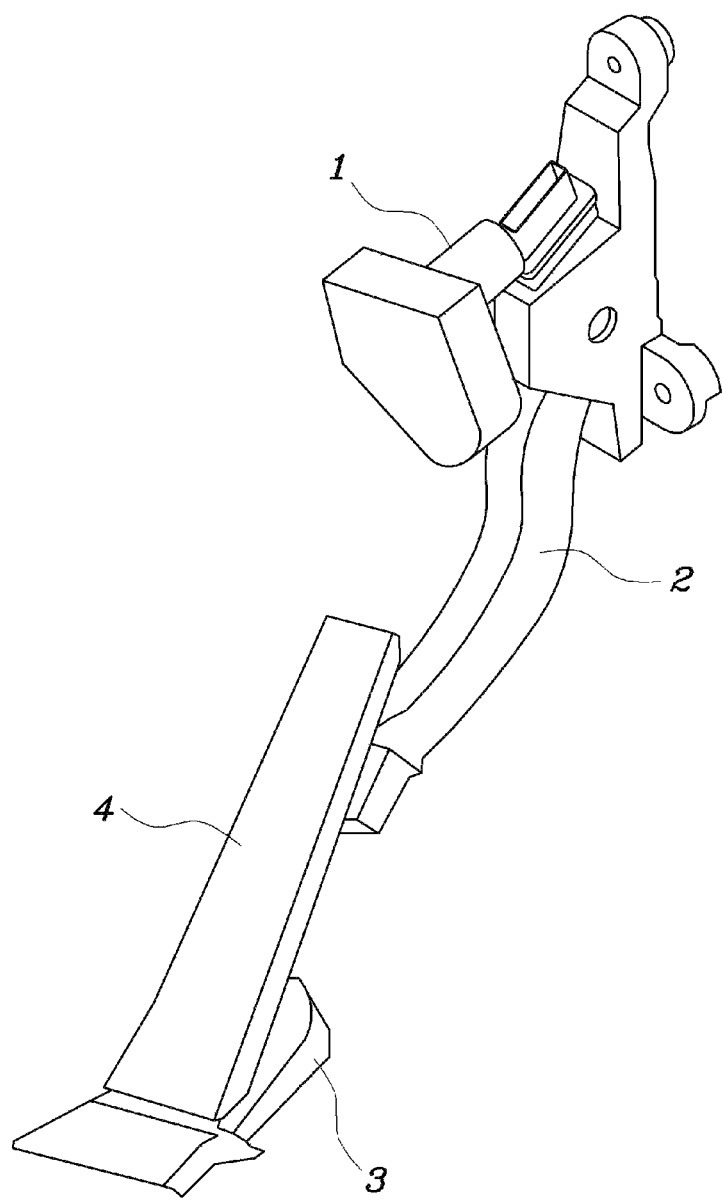
FIGS. 2 through 5 are views illustrating an accelerator pedal having a pedal effort control function.

Hereinbelow, an embodiment of the present disclosure will be described in detail with reference to the accompanying drawings.

Referring to FIGS. 2 through 5, a vehicle accelerator pedal having a pedal effort control function includes a pedal arm housing 1 securely mounted to a frame panel placed below a driver's seat, and a pedal arm 2 with one end rotatably connected to the pedal arm housing 1. The vehicle accelerator pedal further includes a pedal bracket 3 securely mounted to a floor panel placed below the driver's seat, and a pedal pad 4 with one end rotatably connected to the pedal bracket 3 and coupled to the pedal arm 2 by ball joint.

A spring plate 5 is combined with an end of the pedal arm 2 placed in the pedal arm housing 1. The pedal arm 2 can be rotated around a hinge shaft 7 relative to the pedal arm housing 1.

The accelerator pedal includes a pedal effort control module 10. The pedal effort control module 10 includes a first end of a spring 11 held by an end of the pedal arm 2 which is disposed in the pedal arm housing 1. A spring support block 12 supports a second end of the spring 11. A motor 13 is securely installed in the pedal arm housing 1. A power transmitter 14 transmits the output power of the motor 13 to the spring support block 12, thereby moving the spring support block 12 so as to vary the length of the spring 11.

Figure 3:
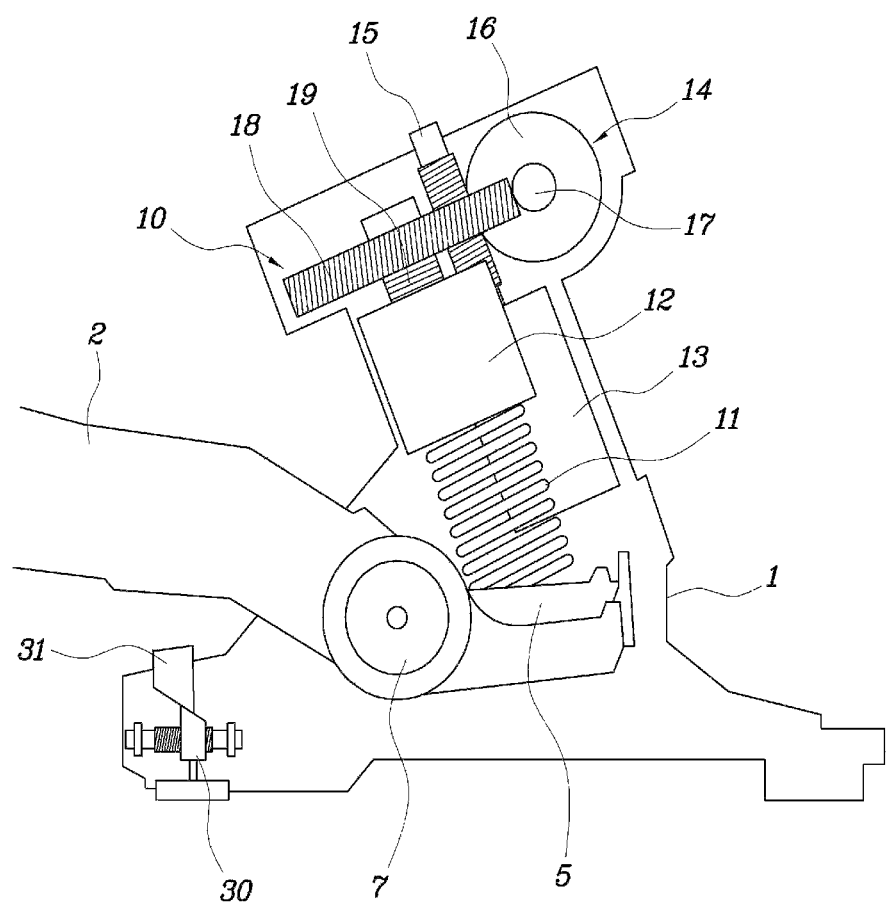
Figure 4:
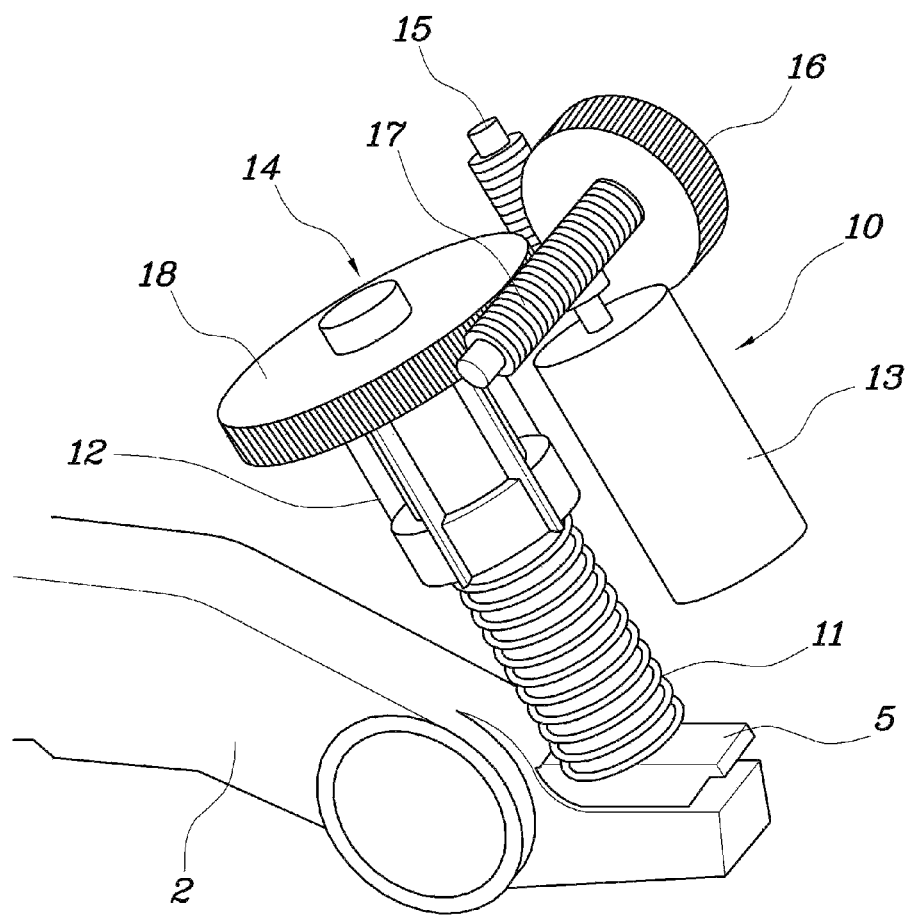
Figure 5:
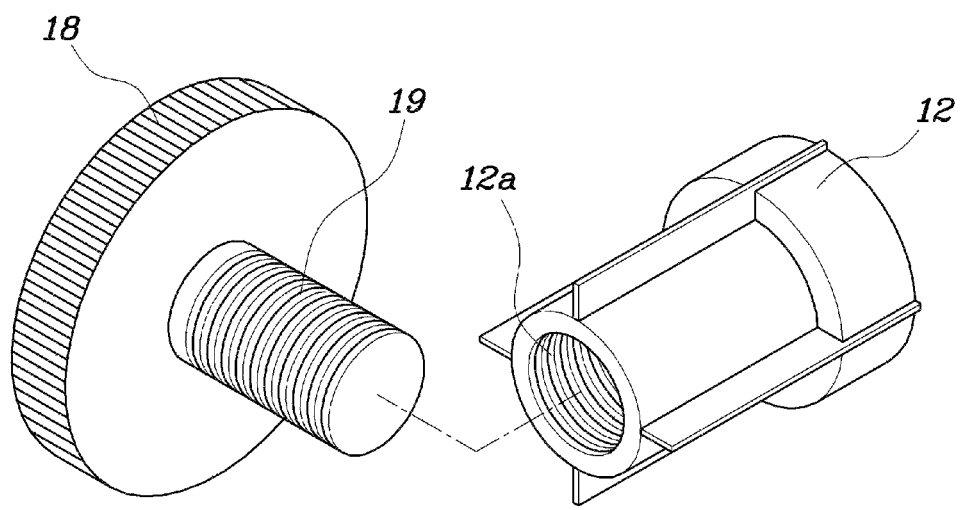

The spring 11 may be directly held on the end of the pedal arm 2. Referring to FIGS. 3 and 4, the spring plate 5 is coupled to the end of the pedal arm 2 in the pedal arm housing 1, and the lower end of the spring 11 is held on the spring plate 5.

Accordingly, when the pedal arm 2 is rotated around the central axis of the hinge shaft 7, the spring 11 is elastically compressed at a portion between the spring plate 5 and the spring support block 12. The elastic compression of the spring 11 is transmitted to the pedal pad 4 through the pedal arm 2, and forms pedal effort in the pedal pad 4.

To transmit the output power of the motor 13 to the spring support block 12, the power transmitter 14 connects the motor 13 to the spring support block 12. The power transmitter 14 includes a first worm gear 15 integrated with an output shaft of the motor 13. A first worm wheel gear 16 is rotatably engaged with the first worm gear 15, a second worm gear 17 is integrated with the center of the first worm wheel gear 16. A second worm wheel gear 18 is rotatably engaged with the second worm gear 17. A gear bolt 19 is integrally formed on the center of the second worm wheel gear 16 protruding from the center of the second worm wheel gear 16, with threads formed around the outer circumferential surface of the gear bolt 19.

Further, the spring support block 12 has a locking hole 12a, with threads formed around the inner circumferential surface of the locking hole 12a, engaging the locking hole 12a with the gear bolt 19. When the second worm wheel gear 18 rotates, the spring support block 12 may rectilinearly move along the gear bolt 19, and the length of the spring 11 may be changed by the rectilinear movement of the spring support block 12, thereby varying the pedal effort.

The operation is automatically controlled by a controller (not shown) with the motor 13 according to vehicle running conditions, driver's physical conditions, driving habits of a driver, a selected gear shift stage, etc.

When an accelerator pedal having controllable pedal effort is installed in a vehicle, the accelerator pedal effort can be actively varied according to APS (Accelerator Position Sensor) operation percentages selected by the driver, thereby improving the accelerator pedal manipulation efficiency of the driver.

That is, the active control method of accelerator pedal effort classifies APS operation percentages into a plurality of groups according to sections when the vehicle is being driven, determines a section in which the APS operation percentages are most frequently selected by the driver when the vehicle being driven is included. Thereafter, when the present APS operation percentage selected at present approaches the section in which the APS operation percentages that have been most frequently selected, the active control method reduces the pedal effort. On the contrary, when the present APS operation percentage approaches another section in which the APS operation percentages that have been most rarely selected, the active control method increases the pedal effort, thereby improving the accelerator pedal manipulation efficiency of the driver.

Figure 6:
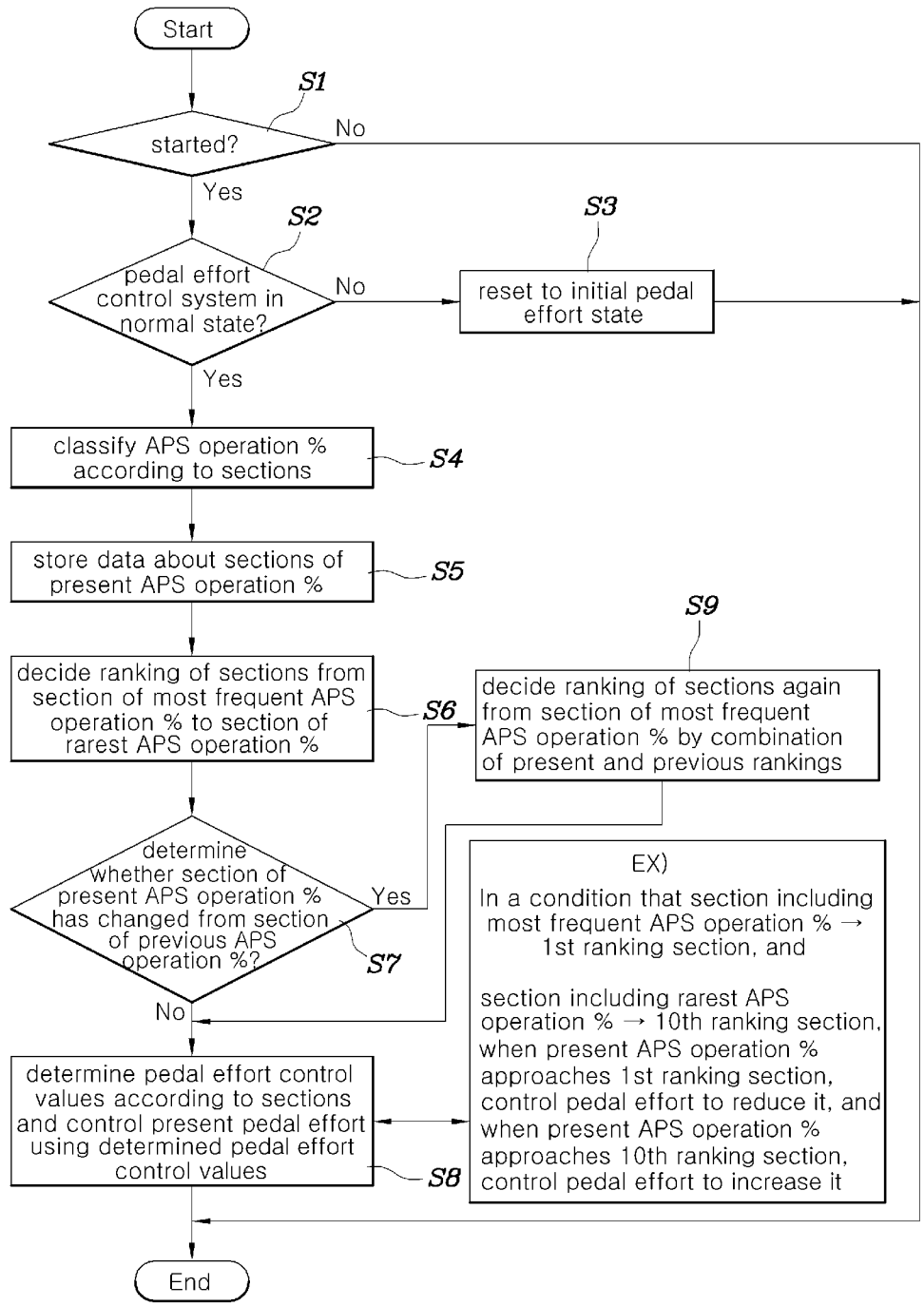
FIG. 6 is a flowchart illustrating a method of actively controlling the pedal effort of the accelerator pedal having the pedal effort control function according to the present disclosure.
Figure 7:
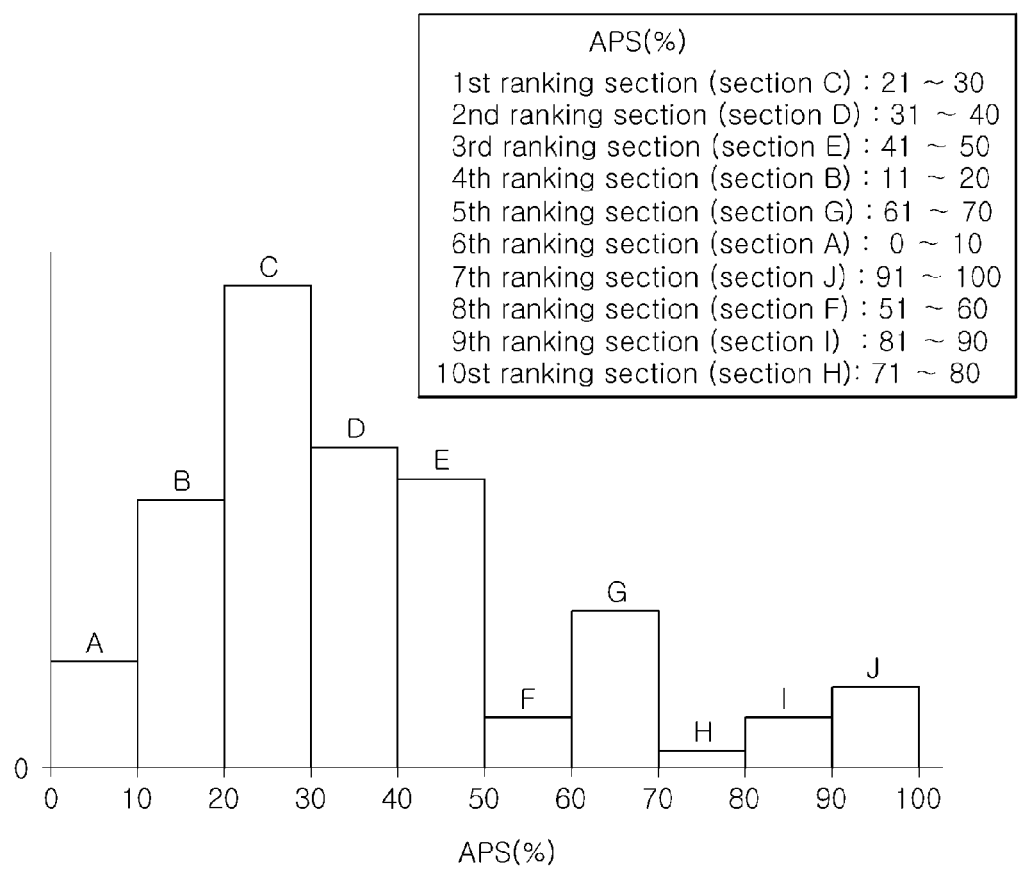
FIG. 7 is a graphic diagram illustrating the ranking of sections, from one section in which APS operation percentages are most frequently selected to another section in which APS operation percentages are most rarely.

Referring to FIGS. 6 and 7, the active control method of pedal effort for accelerator pedal comprises a pedal effort control system checking step of determining whether a pedal effort control system is in a normal state when a vehicle having a controllable pedal effort accelerator pedal starts. A classification step classifies APS operation percentages into groups according to sections. A data storing step stores information data about sections in which the APS operation percentages selected at present when the vehicle having the controllable pedal effort accelerator pedal is being driven are included. A ranking decision step decides the ranking of the sections systematically based on stored information data, from one section in which APS operation percentages are most frequently selected to another section in which APS operation percentages are most rarely selected. A pedal effort control step determines accelerator pedal effort control values according to the ranking of the sections and controls the present accelerator pedal effort using the determined pedal effort control values.

Referring to the diagram of FIG. 7, the classification step may classify the APS operation percentages selected by the driver into ten sections. However, the number of sections is not limited.

The data storing step performs when the pedal effort control system checking step determines that the pedal effort control system is in the normal state. Here, only when a battery voltage signal represents a normal state of a battery, and no signal requiring an initialization of the accelerator pedal effort against an abnormal state has been output, and a signal representing a pedal effort active control mode has been generated, the pedal effort control system is determined to be in the normal state.

Further, when the pedal effort control system checking step determines that the pedal effort control system is in an abnormal state, the present accelerator pedal effort is reset to an initial pedal effort.

Here, the initial pedal effort state means a reset state of the pedal effort.

A ranking change determination step determines whether the section ranking of a present APS operation percentage selected when the vehicle is being driven has changed from the section ranking of the APS operation percentage previously selected.

When the ranking change determination step determines that the section ranking of the present APS operation percentage has not changed from the section ranking of the previous APS operation percentage, the process directly progresses to the pedal effort control step.

However, if the section ranking of the present APS operation percentage has changed from the section ranking of the previous APS operation percentage, a ranking redecision step is performed. The ranking of the sections is decided again systematically from one section in which APS operation percentages are most frequently selected to another section in which APS operation percentages are most rarely selected by a combination of the present and previous section ranking. After the ranking redecision step is performed, the process progresses to the pedal effort control step.

At the pedal effort control step, the present accelerator pedal effort can be increased or reduced. For example, when the section in which APS operation percentages are most frequently selected is designated as the first ranking section, the section in which APS operation percentages are most rarely selected is designated as the tenth ranking section. When the APS operation percentage selected at present approaches the first ranking section, the active control method controls the accelerator pedal effort to reduce the pedal effort. On the other hand, when the APS operation percentage selected at present approaches the tenth ranking section, the active control method controls the accelerator pedal effort to increase the pedal effort.

Referring to FIG. 7, the first ranking section in which the APS operation percentages are most frequently selected by the driver is section C, where the range of the APS operation percentages is 21~30%. When the APS operation percentage selected during the process of driving the vehicle approaches the first ranking section (section C), the present accelerator pedal effort is reduced, thereby improving the accelerator pedal manipulation efficiency of the driver in the first ranking section.

On the other hand, the tenth ranking section, in which the APS operation percentages are most rarely selected by the driver, is section H where the range of the APS operation percentages is 71~80%. When the APS operation percentage selected at present approaches the tenth ranking section (section H) after passing the first ranking section (section C), the present accelerator pedal effort is increased, thereby guiding the driver to manipulate the accelerator pedal within the first ranking section.

The operation of an embodiment of the present disclosure will be described hereinbelow.

Referring to FIG. 3, when the controller controls the motor 13, and the output power of the motor 13 is transmitted to the spring support block 12 through the worm gears 15 and 17, the worm wheel gears 16 and 18, and the gear bolt 19, the spring support block 12 moves upward or downward along the gear bolt 19.

When the spring support block 12 moves upward along the gear bolt 19 (in a direction away from the spring plate), the spring 11 is elastically tensioned by the restoring force, thereby increasing the length of the spring 11. In the above state, the spring force acting on the pedal arm 2 is reduced, and so is the accelerator pedal effort.

On the contrary, when the spring support block 12 moves downward along the gear bolt 19 (in a direction toward the spring plate), the spring 11 is elastically compressed, thereby reducing the length of the spring 11. In the above state, the spring force that acts on the pedal arm 2 is increased, and so is the accelerator pedal effort.

The motor 13 is automatically operated under the control of the controller (not shown). For example, when the present APS operation percentage selected by a driver while driving the vehicle approaches a section in which the APS operation percentages are more frequently selected by the driver, the active control method actively reduces the present accelerator pedal effort. On the contrary, when the present APS operation percentage approaches another section in which the APS operation percentages are most rarely selected by the driver, the active control method actively increases the present accelerator pedal effort.

When the driver drives the vehicle at a low speed, for example, on a congested street in the city, the pedal effort is reduced, thereby reducing the fatigue of the driver caused by the repeated pedal manipulation. However, when the driver drives the vehicle at a high speed, for example, on an express highway, the pedal effort is increased, thereby supporting the pedal under a constant pressure and reducing the fatigue in the driver's ankle.

When driving uphill, the pedal effort is reduced so as to increase a pedal manipulation amount. When driving downhill, the pedal effort is increased so as to reduce the pedal manipulation amount.

Further, when the vehicle is driven at a high speed or is driven in a safety mode, the pedal effort is increased so as to allow a driver to safely drive the vehicle. The pedal effort can be appropriately controlled in consideration of age, sex, and physical conditions of the driver.

Hereinbelow, the method of actively varying the accelerator pedal effort according to the APS operation percentages selected by a driver when a vehicle having the controllable pedal effort accelerator pedal is being driven will be described in detail with reference to FIG. 6.

When the vehicle starts (step S1), the controller determines whether the pedal effort control system is in a normal state or not (step S2). The controller determines at step S2 that the pedal effort control system is in the normal state if a battery voltage signal represents a normal state of a battery, no signal has been output requiring an initialization of the present accelerator pedal effort against an abnormal state, and a signal representing a pedal effort active control mode has been generated. The pedal effort control system is in the normal state when the battery voltage signal is 9V to 16.5V at step S2.

The present accelerator pedal effort is reset to an initial pedal effort state (step S3) if the pedal effort control system is in an abnormal state.

The APS operation percentages selected by the driver are classified into groups according to sections (step S4) when the pedal effort control system is determined to be in the normal state. Thereafter, information data about the sections in which the APS operation percentages selected by the driver at present is stored (step S5). Thereafter, the ranking of the sections is decided systematically, from one section in which APS operation percentages are most frequently selected to another section in which APS operation percentages are most rarely selected (step S6).

After deciding the ranking of the sections, whether the section ranking of the present APS operation percentage selected when the vehicle is being driven has changed from the section ranking of the previous APS operation percentage selected previously is determined (step S7).

When the ranking change determination step determines that the section ranking of the present APS operation percentage has not changed from the section ranking of the previous APS operation percentage, accelerator pedal effort control values are determined based on the ranking of the sections decided at step S6. The operation of the motor 13 is then controlled using the determined accelerator pedal effort control values, thereby controlling the accelerator pedal effort selected at present (step S8).

However, if the ranking change determination step determines that the section ranking of the present APS operation percentage has changed from the section ranking of the previous APS operation percentage, the ranking of sections is decided again systematically, from a section in which APS operation percentages are most frequently selected to another section in which APS operation percentages are most rarely selected by a combination of the present and previous section rankings (step S9). After deciding the ranking of the sections again, the accelerator pedal effort control values are determined again based on the rankings of the sections decided again at step S9. The accelerator pedal effort selected at present is controlled using the determined accelerator pedal effort control values.

Referring to FIG. 7, when the APS operation percentage selected at present approaches the first ranking section (section C) in which the APS operation percentages are most frequently selected, the accelerator pedal effort is reduced, thereby improving the accelerator pedal manipulation efficiency of the driver within the first ranking section.

However, when the APS operation percentage selected at present approaches the tenth ranking section (section H) in which the APS operation percentages are most rarely selected, the accelerator pedal effort is increased, thereby guiding the driver to manipulate the accelerator pedal within the first ranking section.

As described above, when the control method of the present disclosure actively varies the accelerator pedal effort of a vehicle according to the APS operation percentages selected by a driver driving the vehicle, the driver can easily manipulate the accelerator pedal and can efficiently prevent an undesired quick start of the vehicle.

As described above, the active control method of acceleration pedal effort has advantages. The length of the spring 11 can be controlled by moving the spring support block 12 in response to an operation of the motor 13 without changing parts of an accelerator pedal with new parts. The present disclosure can easily vary the pedal effort as desired, and can efficiently meet safety law and regulations of accelerator pedal effort for any kind of vehicle.

Further, in the present disclosure, the accelerator pedal effort can be actively controlled according to the APS operation percentages of a driver, and thereby the driver can easily and efficiently manipulate the accelerator pedal.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. An active control method of accelerator pedal effort, comprising:
   a classification step of classifying accelerator position sensor (APS) operation percentages into groups according to sections;
   a data storing step of storing information data about sections in which the APS operation percentages are selected at present when a vehicle having a controllable pedal effort accelerator pedal is being driven;
   a ranking decision step of deciding a ranking of the sections systematically based on stored information data according to selection frequencies of the APS operation percentages by a driver; and
   a pedal effort control step of determining accelerator pedal effort control values according to the decided ranking of the sections, and controlling a present accelerator pedal effort of the vehicle being driven using the determined pedal effort control values.

2. The active control method of accelerator pedal effort as set forth in claim 1, further comprising, after the ranking decision step:
   a ranking change determination step of determining whether a section ranking of a present APS operation percentage selected when the vehicle is being driven has changed from a section ranking of a previously selected APS operation percentage.

3. The active control method of accelerator pedal effort as set forth in claim 2, wherein, when the ranking change determination step determines that the section ranking of the present APS operation percentage has not changed from the section ranking of the previous APS operation percentage, a process directly progresses to the pedal effort control step.

4. The active control method of accelerator pedal effort as set forth in claim 2, wherein, when the ranking change determination step determines that the section ranking of the present APS operation percentage has changed from the section ranking of the previously selected APS operation percentage, a ranking redecision step is performed, in which the ranking of the sections is decided again systematically according to the selection frequencies of the APS operation percentages, by a combination of the present section ranking and the previously selected section ranking, and a process progresses to the pedal effort control step after the ranking redecision step.

5. The active control method of accelerator pedal effort as set forth in claim 1, wherein, the sections are ranked from a first ranking section to a tenth ranking section according to the number of the selection frequencies of the APS operation percentages, and when the APS operation percentage selected when the vehicle is being driven approaches the first ranking section, the accelerator pedal effort is reduced, and when the APS operation percentage selected at present approaches the tenth ranking section, the accelerator pedal effort is increased.

6. The active control method of accelerator pedal effort as set forth in claim 1, further comprising:

a pedal effort control system checking step of determining whether a pedal effort control system is in a normal state when the vehicle starts, prior to the data storing step.

7. The active control method of accelerator pedal effort as set forth in claim 6, wherein, when the pedal effort control system checking step determines that the pedal effort control system is in the normal state, the data storing step performs, and when the pedal effort control system is in an abnormal state, the present accelerator pedal effort is reset to an initial pedal effort.

8. The active control method of accelerator pedal effort as set forth in claim 6, wherein, when a battery voltage signal represents a normal state of a battery, no signal requiring an initialization of the present accelerator pedal effort against an abnormal state has been output, and a signal representing a pedal effort active control mode has been generated, the pedal effort control system checking step determines that the pedal effort control system is in the normal state.

* * * * *